G. N. Palmer,
Hay Spreader.
No. 65113 — Patented May 28, 1867
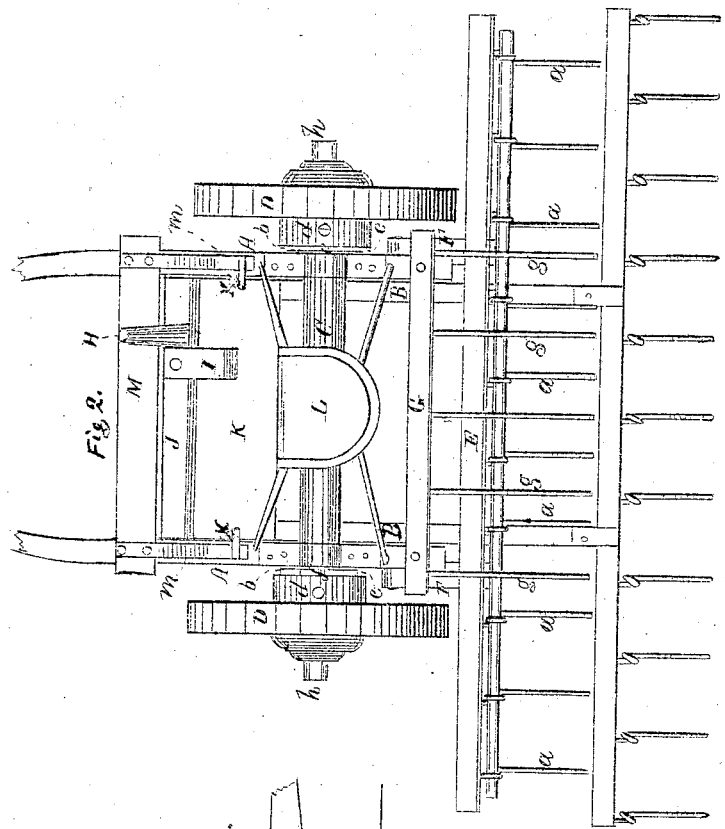
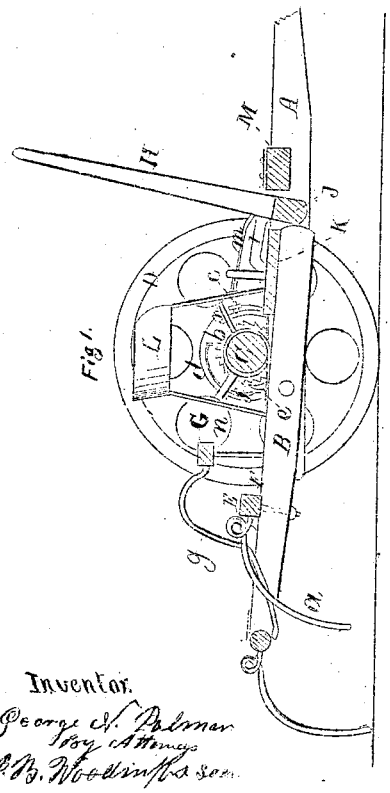
Inventor.
George N. Palmer
By Attorneys
J. B. Woodruff & Son
Witnesses
C. J. Davis
L. F. Page

United States Patent Office.

GEORGE N. PALMER, OF GREEN, NEW YORK.

Letters Patent No. 65,113, dated May 28, 1867.

IMPROVED HORSE-RAKE AND HAY-SPREADER.

The Schedule referred to in these Letters Patent and making part of the same.

TO ALL WHOM IT MAY CONCERN:

Be it known that I, GEORGE N. PALMER, of Green, in the county of Chenango, in the State of New York, have invented certain new and useful improvements in combined Horse-Rakes and Hay-Tedding Machines; and the following is a full, clear, and exact description of the same, reference being had to the accompanying drawings, making a part of this specification, in which—

Figure 1 represents a section through a side elevation of the machine.

Figure 2 shows a plan or top view of the same.

My invention, as set forth the following specification, is for additional improvements on a combined horse-rake and hay-tedding machine for which I obtained Letters Patent of the United States, dated December 12, 1865, and consists in the combination of the balanced frame with the automatic mechanism for raising the rake, and the position of the liberating fingers or cleaners above the rake-teeth bar, so that the bosom of the rake is left open, there being no obstruction to its taking in a windrow to its fullest capacity. My improvement further consists in the clutches, or mode of holding the pawls out of the ratchet-wheels when the machine is used for raking, and letting them in when used for tedding or turning the hay.

To enable others to construct and use my improvement or invention, I will describe it, referring to the drawings.

In order that there may be nothing to fall below the line of the shafts A A and the balanced frame B B to obstruct the grass or hay from coming in contact with the rake-teeth $a\,a\,a\,a$ for raking hay into windrows, on both sets of the teeth for tedding or turning the hay when spread for drying, I place the revolving axle C above the shafts and frame and use such sized wheels D D as most desirable. On both ends of the axle C are secured ratchet-wheels $b\,b$. On the inner ends of the wheel-hubs $d\,d$ are secured the dogs or pawls $e\,e$, with their springs $f\,f$ to hold them in the rachets when it is necessary to rotate the axle to operate the tedding apparatus. The pawls $e\,e$ are thrown and held out of the ratchets $b\,b$ by the thumb-screws $c\,c$ operating on the lever end of the pawls $e\,e$, (as seen in fig. 1,) so that the axle C is at rest, the wheels $d\,d$ turning on the arms $h\,h$ in the ordinary manner, when used for a buggy one-horse hay-rake. The operation of the tedding apparatus being fully set forth in my patent aforesaid, it is not deemed necessary to describe it here, or its operation.

My improvements for operating the rake and liberating the hay in windrows consist in attaching the rake-head E to the short levers F F, and hinging them to the rear ends of the thills A A, and connecting them with the frame F, so that by the action of the frame the rake-teeth $a\,a\,a$ are thrown back and are liberated from the windrows by the aid of the fingers or bars $g\,g\,g\,g$, which are secured to the bar or head G above the rake E on the rear ends of the shafts A A, so that they will admit of the rake being filled to its fullest capacity and then left in a good-sized windrow, at the will of the driver, by the action of the hand-lever H on foot-piece I on the rock-shaft J; the movable frame B B being secured to the shafts A A in such a position that the foot-piece K in front of the driver's seat L, with a light weight, will about balance the raking and tedding apparatus, the action being regulated and adjusted by the screw hooks $k\,k$ at both ends of the foot-piece K, they operating on the springs $m\,m$. More or less movement can be given to the frame B B to operate the rakes for turning heavy or light mown grass by turning the screw hooks $k\,k$ up or down. If the grass is light but little motion is required; if it is heavy any amount of motion necessary to turn it may be given by the adjustment before mentioned. The springs $m\,m$ may be secured to the shaft-timbers A A or to the whiffle-tree bar M, and of sufficient capacity to keep the balanced frame B B up, so that the rear rakes will be in position to operate, by the cam or pins $n\,n$, in the revolving axle C for tedding the hay, or to be operated by the driver in his seat, either by pressing on the foot-piece I or by the hand-lever H.

The arrangement and combination of the mechanism and parts above described form one of the most practical and efficient implements and labor-saving machines for the purposes it is designed, and with the use of it between the mowing machine and late improvements in the hay-loading apparatus, but little physical force and manual labor are required to secure a large crop of hay.

Having thus described my improvements in a combined horse hay-raking and tedding machine, what I claim as new, and desire to secure by Letters Patent, is—

1. The arrangement and combination of the balanced frame B B, short levers F F, and the rake-head E, in the manner herein described for the purposes set forth.

2. I claim regulating and adjusting the tilting motion of the frame B by the screw hooks $k\ k$ and springs $m\ m$, as described.

3. I claim the combination of the pawls $e\ e$, ratchets $b\ b$, and thumb-screws $c\ c$, constructed and arranged substantially as and for the purposes specified.

In testimony whereof I hereunto subscribe my name in the presence of witnesses.

GEORGE N. PALMER.

Witnesses:
 EDM. F. BROWN,
 J. B. WOODRUFF.